United States Patent [19]

Bernstein

[11] 3,733,999

[45] May 22, 1973

[54] BARBECUE SPIT AND DRIVE MECHANISM

[76] Inventor: Bernard J. Bernstein, 3629 North 5th Avenue, Phoenix, Ariz. 85013

[22] Filed: Feb. 19, 1971

[21] Appl. No.: 116,996

[52] U.S. Cl..................99/337, 99/339, 99/421 H
[51] Int. Cl..............................A47j 37/04
[58] Field of Search....................99/339, 340, 420, 99/421, 423, 337, 338; 126/25, 30; 74/84

[56] References Cited

UNITED STATES PATENTS

| | | | |
|---|---|---|---|
| 2,405,984 | 8/1946 | Sharpe | 99/337 X |
| 1,554,645 | 9/1925 | Morris | 99/421 HH |
| 1,605,143 | 11/1926 | Renfroe | 99/421 HH |
| 2,142,390 | 1/1939 | Zerr | 99/420 |
| 2,557,963 | 12/1951 | Hagopian | 99/339 UX |
| 3,169,470 | 2/1965 | Oatley | 99/421 HH |
| 3,321,982 | 5/1967 | Maunus et al. | 74/84 |
| 3,339,479 | 9/1967 | Miller et al. | 99/421 HV |
| 3,359,887 | 12/1967 | Cleveland | 99/421 HV |
| 3,447,445 | 6/1969 | Koziol | 99/421 R |

Primary Examiner—Billy J. Wilhite
Assistant Examiner—Arthur O. Henderson
Attorney—Eric P. Schellin and John A. Robertson

[57] ABSTRACT

A barbecue spit and drive mechanism having upwardly open concave cradle type bearings in which a spit is rotatably mounted; a rotary gear disposed on a spit and adapted to engage a motor driven gear when the spit is in said upwardly open concave bearings, whereby the loaded spit may be readily and conveniently moved vertically downward into engagement with said bearings and into driving relationship with said motor driven gear. The mechanism also includes a safety cover, for the gear on said spit, adapted to prevent rotation of said gear on said spit when said cover is in open position relative thereto; and means operable by said cover adapted to prevent rotation of said spit when said cover is in open position over said gear on said spit.

2 Claims, 7 Drawing Figures

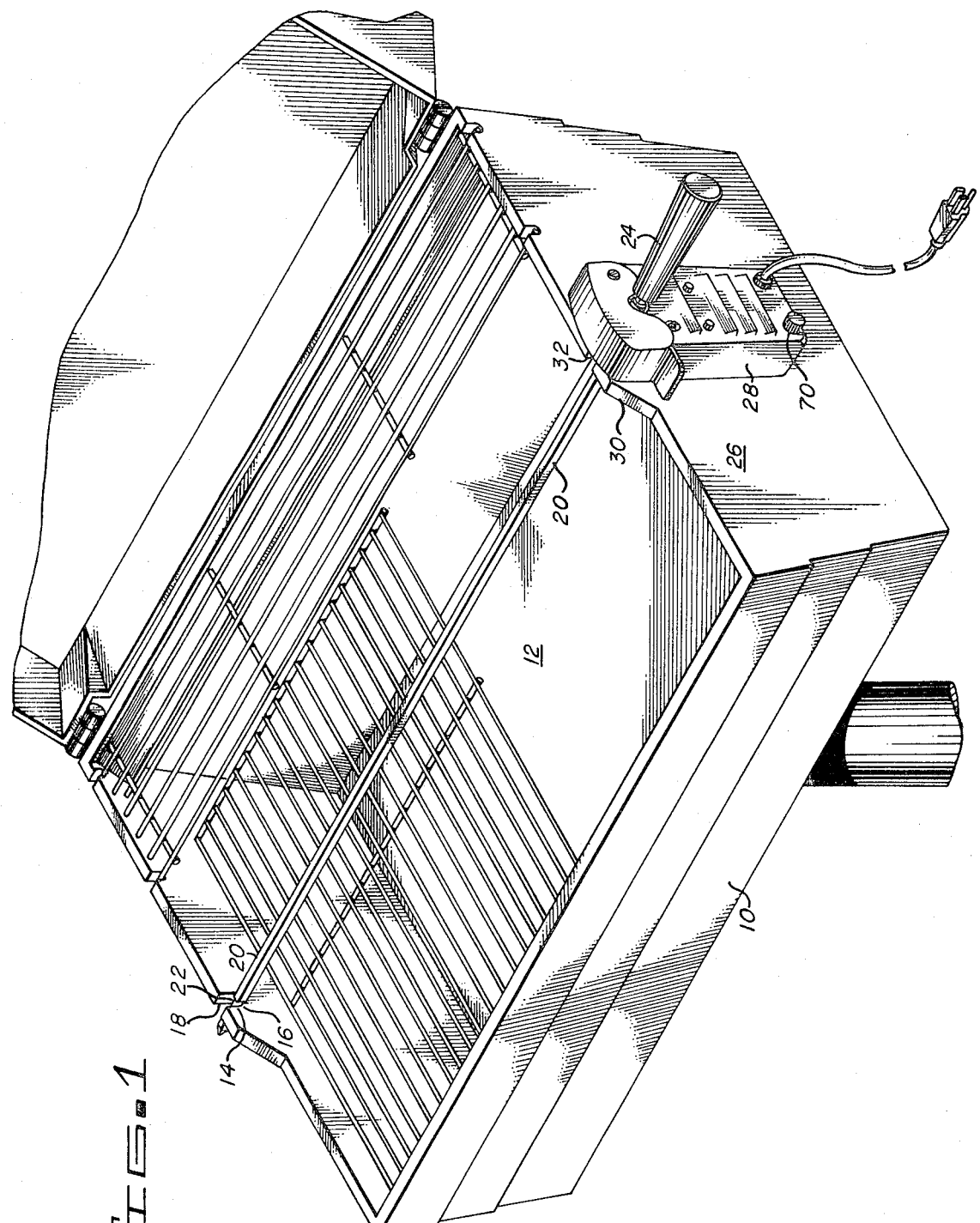
INVENTOR.
BERNARD J. BERNSTEIN

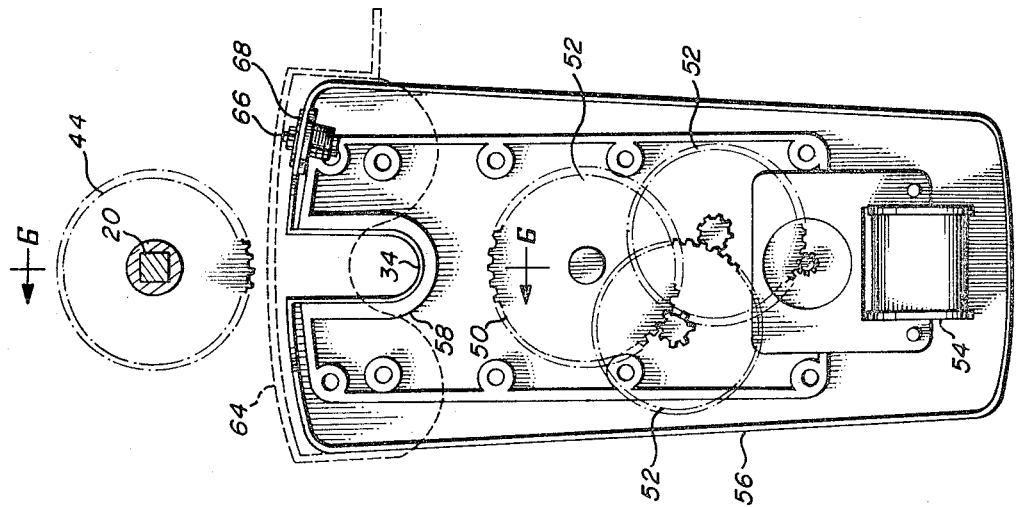
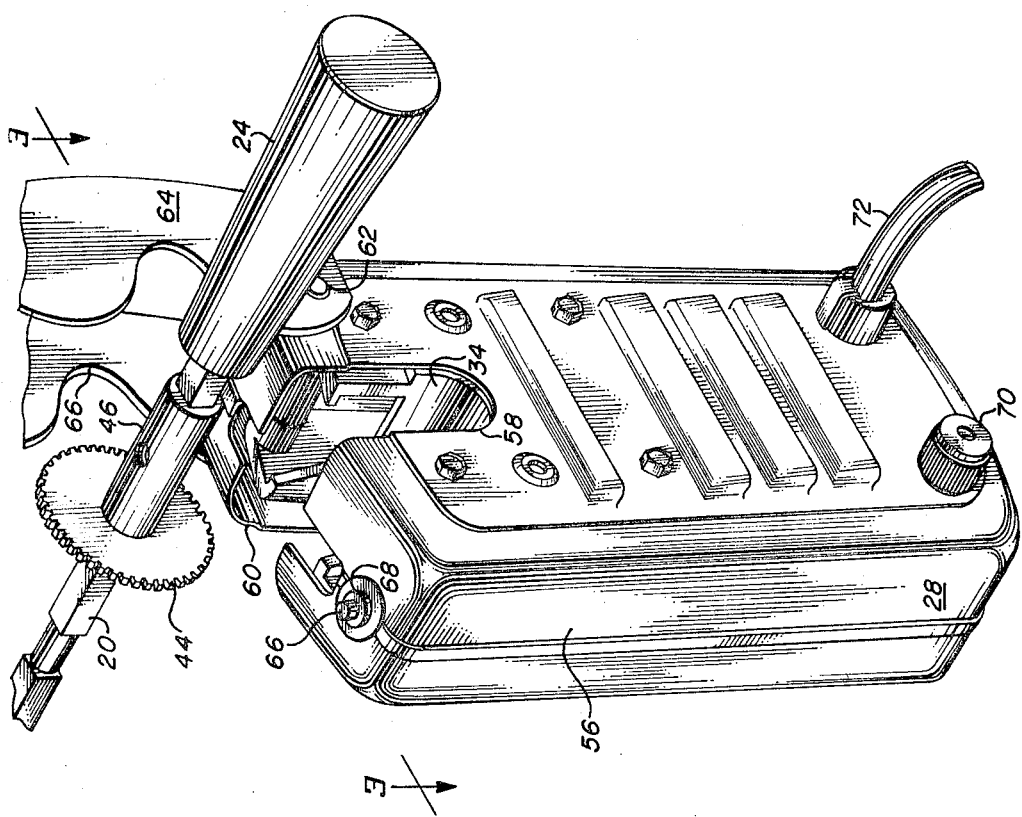

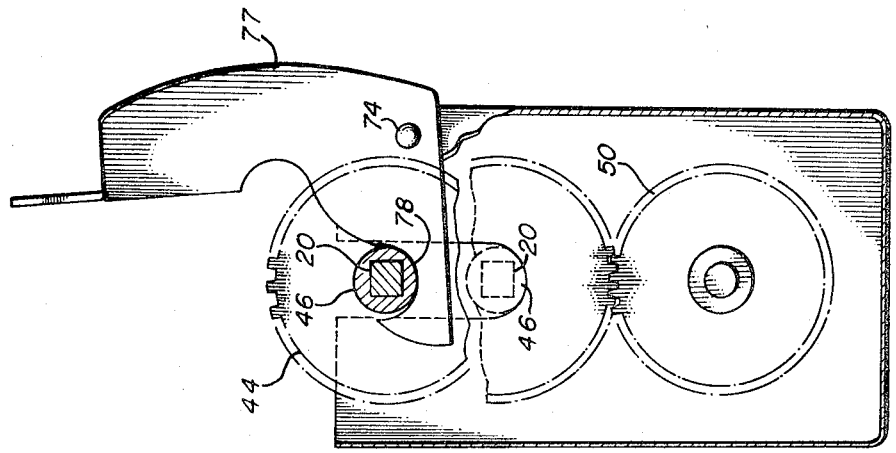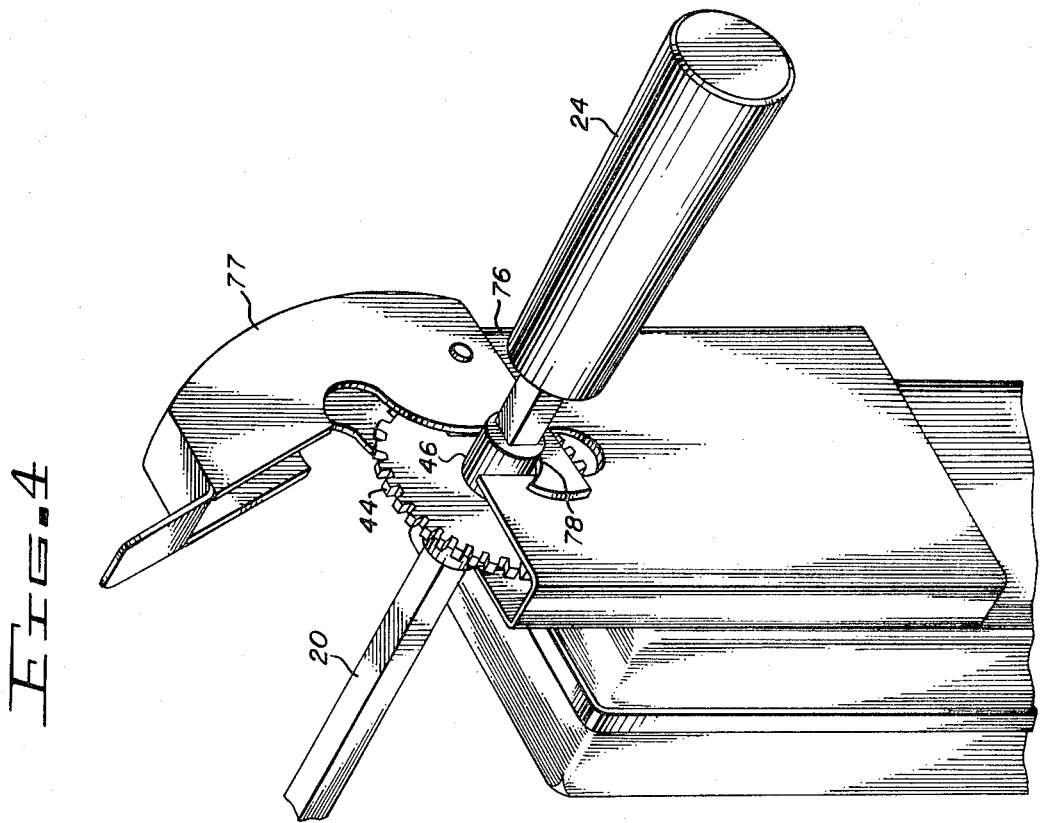

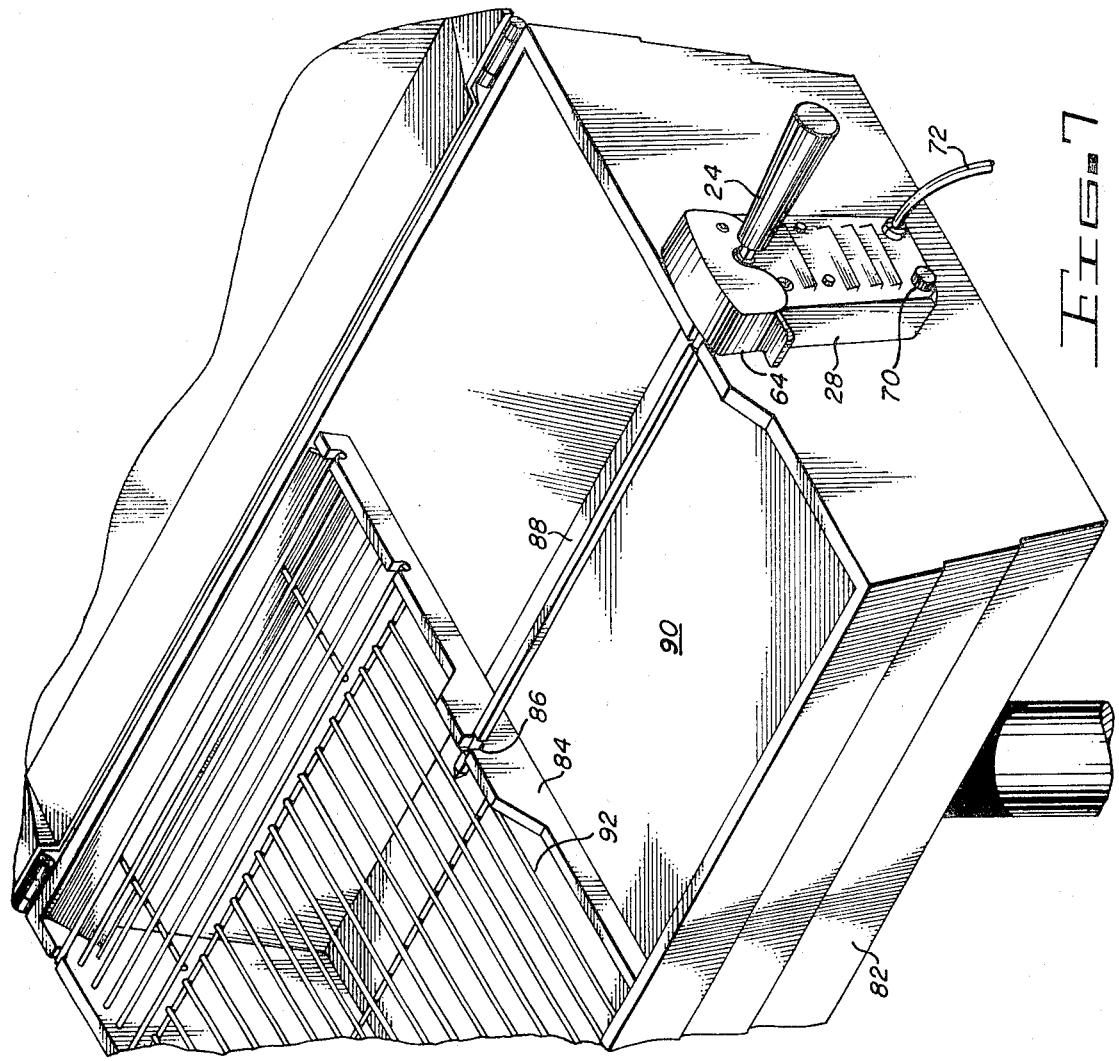
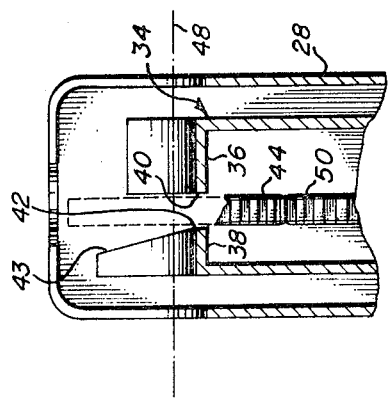

BARBECUE SPIT AND DRIVE MECHANISM

Motorized barbecue spits of the prior art have generally been of a rectangular cross section and provided with a handle on one end while the opposite end thereof has been motor driven by a rectangular socket in which the end of the spit is fitted manually.

When such a conventional barbecue spit is heavily loaded it is difficult to place the end of the spit in a conforming rectangular drive socket, and in many instances this must be done while holding the loaded spit over a fire pit. Usually the end of a barbecue spit is tapered in opposed relation to the end on which the handle is located, heavily loaded spits impose a substantial load on the handle and therefore, the cantilever loading on the spit may be such as to render great difficulty in placing the end of the spit in the rectangular motor driven socket. Such may be particularly true where large and heavy portions of food, such as a turkey or the like, are being barbecued. In such instances, it has been found necessary to manually support such heavily laden spits by the human hand over a hot fire pit and consequently, conventional barbecue spits and related drive mechanisms have been somewhat unsatisfactory due to the difficulty of engaging the spit with the drive motor after the spit has been heavily loaded and when the barbecue fire is hot and ready to barbecue food.

It is usually necessary to bring a barbecue pit up to the conventional barbecue temperature when charcoal or other material is used and to allow the charcoal to reach a proper temperature before any food is placed thereover.

In accordance with the foregoing, it will be appreciated that most conventional barbecue spits, of necessity, require that the food be placed over the pit after the fire is up to barbecue temperature and that the placement of a heavily loaded spit thereover may be hazardous to the human hands.

In accordance with the present invention, a barbecue pit structure is provided with spit supporting bearings which are concave upwardly open cradle type bearings into which a spit may be moved downwardly and directly into such bearings; the spit of the invention carries a gear thereon adapted to mesh with a motor driven gear stationarily mounted relative to the barbecue pit structure of the invention. These features of the invention permit facility in placing a heavily loaded spit over a hot barbecue area by supporting the spit in a cantilever fashion by the handle at one end thereof. The invention also includes a safety cover adapted to move into position over a driven gear on the barbecue spit so as to protect the hands from the gear when it is rotating. The cover is adapted to engage a motor energizing switch, when in closed position, to permit operation of the motor only when the cover is closed. A modification of the invention employs pivots cradle bearing means carried by the cover which automatically disengages the gear on the barbecue spit from the motor driven gear when the cover is opened. Accordingly the cover must be closed before the gear carried by the barbecue spit rotates. The invention also comprises very compact spit drive mechanism including a motor driven gear train and end play bearing means for maintaining a meshed relationship of a gear carried by the spit with the motor driven gear train so that the spit may be readily removed and/or engaged with its supporting bearings and whereby the gear, carried by the spit, may readily and accurately engage the gear train each time the spit is placed in its supporting cradle bearings for rotatably carrying food above the barbecue pit structure of the invention.

The invention also includes a barbecue pit structure having separate grill and barbecue areas whereby food may be grilled over one of the areas while the barbecue spit of the invention may be rotatably supported for carrying food to be barbecued over another area of the barbecue pit structure. An intermediate bearing is disposed at an intermediate portion of the pit structure so as to support one end of the spit of the invention while the opposite end thereof is driven by means of a gear carried on the spit and in mesh with a motor driven gear.

Accordingly, it is an object of the present invention to provide a barbecue spit and drive mechanism which is very convenient to use when the spit is heavily loaded and it is desired to engage the spit with supporting bearings and rotary drive mechanism of the invention.

Another object of the invention is to provide a barbecue spit and drive mechanism which permits the spit of the invention readily to be engaged with upwardly open concave bearings when the spit is heavily loaded and when it is placed over a hot barbecue area and whereby the spit may be engaged with rotary drive mechanism without the necessity of placing a person's hand over the hot barbecue pit area.

Another object of the invention is to provide a barbecue spit and drive mechanism wherein the spit carries a rotary gear adapted to be engaged and disengaged with a motor driven gear stationarily operable adjacent the pit structure of the invention and wherein a safety cover prevents rotation of the gear on said spit when the cover is in open position.

Another object of the invention is to provide a barbecue spit and drive mechanism wherein the spit of the invention is adapted to be placed downwardly in a vertical relation into upwardly open concave bearings and wherein one of the bearings is disposed at an intermediate area or location over a barbecue pit structure of the invention so that food may be carried by the spit of the invention over a first area of the pit structure while other food may be grilled on a grill over another area of the barbecue pit structure.

Another object of the invention is to provide a novel barbecue spit and drive mechanism wherein a barbecue spit is provided with a handle and a rotary bearing adjacent thereto with a gear fixed to the spit adjacent to said bearing and wherein said gear and bearing is adapted to be engaged vertically with drive mechanism having a motor driven gear and wherein end play bearing means positively locates the gear on said spit relative to the motor driven gear when the bearing, adjacent to the handle and the spit is vertically placed in a complimental upwardly open concave bearing carried by the drive mechanism of the invention.

Another object of the invention is to provide a safety cover for a rotary gear carried on a barbecue spit of the invention, the safety cover being adapted, either to operate a motor control switch, or to raise the spit such that the gear on the spit is disengaged from a motor driven gear so that when the cover is closed, the spit is permitted to rotate and when the cover is open, the spit and the gear carried thereby are stopped from rotation so that the fingers of the operator may not be caught in the gears of the invention.

Further objects and advantages of the invention may be apparent from the following specification, appended claims, and accompanying drawings, of which:

FIG. 1 is a perspective view of a barbecue spit and drive mechanism of the invention mounted on a pit structure and showing portions of the pit cover fragmentarily;

FIG. 2 is an enlarged fragmentary perspective view of barbecue spit and drive mechanism of the invention showing a barbecue spit having a rotary gear coupled thereto and in position removed from the supporting bearings and gear train of the drive mechanism;

FIG. 3 is a sectional view taken from the line 3—3 of FIG. 2 showing a safety cover in closed position and operating a motor energizing switch of the invention;

FIG. 4 is a view similar to FIG. 2 and showing a modification of the invention wherein a safety cover is provided with bearing cradles adapted automatically to disengage a gear, carried by the spit of the invention, from the motor driven mechanism of the invention when the cover is opened and it is desired to remove the spit from the barbecue pit area;

FIG. 5 is a view similar to FIG. 3, but showing the modification as disclosed in FIG. 4;

FIG. 6 is a fragmentary sectional view taken from the lines 6—6 of FIG. 3 showing end play bearing structure of the invention adapted to maintain a meshed relation between the barbecue spit rotary gear and a motor driven gear of the invention; and FIG. 7 is a view similar to FIG. 1 but showing a modification of the invention wherein an intermediate bearing supports the spit of the invention so that two separate areas of the pit structure are available for barbecuing food on the spit as well as on a grill.

As shown in FIG. 1 of the drawings, the invention comprises a generally box-shaped pit structure 10 having a hearth area 12 wherein charcoal or other heating means may be disposed to provide heat over which food may be barbecued.

The pit structure 10 carries an upstanding bearing support 14 provided with a generally U-shaped upwardly facing, or upwardly open, concave bearing portion 16. This bearing is open at 18 and one end of a spit 20 is rotatably mounted and vertically removable or replaceable relative to said upwardly facing concave bearing 16. The bearing portion 16 may have a concave surface which is equal to 180 degrees, or less, of an arcuate geometry.

The spit 20 is provided with a bearing portion 22 rotatably mounted in the upwardly facing concave bearing portion 16 and an opposite end of the spit 20 is provided with a handle 24 fixed thereto. Mounted on one end 26 of the box-shaped barbecue pit structure 10 is a spit drive mechanism 28 shown in detail in FIGS. 2 and 3 of the drawings. An end portion 30 of the barbecue pit structure 10 is provided with an upwardly open notch 32 through which the spit 20 extends but which does not provide any contact or bearing surface for the spit 20.

The drive mechanism 28 is provided with a concave substantially semicircular cradle-type or generally U-shaped bearing portion 34 which is opened upwardly and which is illustrated in FIGS. 2, 3 and 6 of the drawings. This concave bearing portion 34 comprises two separate portions 36 and 38 which have adjacent ends 40 and 42 spaced apart to provide for end play bearing means between which a rotary gear 44, fixed on the spit 20, may be disposed as will be hereinafter described. As shown in FIG. 2 of the drawings, the spit 20 is provided with a concentric bearing 46 disposed adjacent the gear 44 and the handle 24. This concentric bearing 46 is adapted to bear in the upwardly open concave cradle bearing 34 in its bearing portions 36 and 38 which are axially aligned about a barbecue spit axis indicated by broken lines 48 in FIG. 6 of the drawings. The cradle bearing 34 may have a concave surface which is equal to 180 degrees, or less, of an arcuate geometry.

The gear 44 carried by the spit 20 is adapted to mesh with a gear 50 of a gear train 52 driven by an electric motor 54 of the drive mechanism 28. This mechanism 28 is contained in a housing 56 which is provided with notches 58 and 60 in the sides thereof which are open upwardly to the top of the housing 56 and which are slightly larger at the bottom than the radius dimensions of the concave bearing portions 36 and 38 so that the bearing 46 on the spit 20 may bear only on the concave upwardly open bearing portions 36 and 38 of the concave bearing structure 34.

Pivotally mounted on the housing 56 by means of a suitable pivot pin 62 is a cover 64 provided with notches 65 adapted to straddle the spit 20 when the bearing 46 is in the concave bearing portions 36 and 38.

The cover 64 is a safety cover adapted to cover the gear 44 when it is in mesh with the gear 50 to prevent a person's fingers from being caught and injured by the gear 44 when it is rotated by the motor driven gear 50.

When the cover 64 is in the broken line position as shown in FIG. 3, it engages a reciprocating button 66 of a switch 68 which is in series with a starting switch 70 adapted to conduct electrical energy from a power supply cord 72 to the motor 54. It will be understood that when the cover 64 is in the position shown in FIG. 3, the button 66 of the switch 68 is depressed thereby closing the switch in series with the switch 70 so that the motor 54 may be energized.

When the cover 64 is pivoted upwardly to the solid line position shown in FIG. 2 of the drawings, the normally open switch 68 is then open due to the fact that the button 66 is released, thus, the motor 54 is de-energized immediately as the cover 64 is opened, thus, stopping the motor and operation of the gear 50 as well as rotary operation of the gear 44 and the spit 20.

Accordingly, each time the cover 64 is closed, the switch 68 is closed so that the switch 70 may be used to energize the motor 54 and in the event the switch 70 is closed and when the cover 64 is opened, the switch 68 opens a circuit to de-energize the motor 54 and thereby provide safety in the operation of the mechanism of the invention to prevent a person's fingers from being caught by the gear 44.

A modification of the invention as shown in FIGS. 4 and 5 of the drawings, comprises a safety cover 77 pivoted on a pin 74 to a modified housing 76 which houses a motor and gear train similar to the motor 54 and gear train 52.

The gear 44 on the spit 20 is normally covered by the cover 72 when in the broken line position as shown in FIG. 5 of the drawings. As shown in FIG. 4 of the drawings, cradle hook means 78, integral with the cover 77, is engageable with the bearing means 46 on the spit 20, adjacent to the handle 24, whereby raising of the cover 77 into the position as shown in FIG. 4 of the drawings, causes the cradle hook 78 to elevate the bearing 46 and spit 20 such as to elevate the gear 44 and disengage its peripheral teeth 80 from complimental teeth on the gear 50 as hereinbefore described. Thus, raising of the safety cover 77 automatically disengages the gear 44 from the gear 50 and prevents rotation of the gear 44 when the cover 77 is moved to open position thereby preventing a person's fingers from being caught by the gear 44.

When the cover 77 is moved downward into the broken line position as shown in FIG. 5, the cradle hook 78 pivots downwardly a sufficient distance to allow peripheral meshed engagement of the teeth 80 of the gear 44 with complimental teeth on the gear 50.

As shown in FIG. 7 of the drawings, the invention includes a modified pit structure designated 82. This pit structure 82 is similar to the pit structure 10 but is provided with an intermediate bearing portion 84 similar to the hereinbefore described bearing 16.

The bearing 84 supports one end 86 of a relatively shorter spit 88 similar to the hereinbefore described spit 20.

Accordingly, the spit 88 may be used to rotatably support food being barbecued over a first hearth area 90 of the barbecue pit structure 82. A grill 92 is disposed over a second hearth area of the pit structure 82 and may be used for stationary grilling of food while the spit 88 is used rotatably to barbecue food over the area 90.

In operation, the barbecue spit and drive mechanism of the invention provides substantial facility in the placement of a loaded barbecue spit over a hot barbecue pit area. The invention provides simple barbecue spit receiving bearings as hereinbefore described which are generally concave upwardly open bearings which allow vertical placement of the spit 20 or 88 by means of the handle 24 such that a person's hands need not be placed over the hot barbecue area in order to engage the spit with its supporting bearings and motor drive mechanism.

When the spit 20 is loaded with food such as a heavy turkey or the like, the handle 24 supports the spit in cantilever fashion and the one end of the spit 20 may be placed in the bearing 16 and when so placed is merely lowered vertically into the upwardly open concave bearing 16 while the bearing 46 is lowered into the upwardly open concave bearing structure 34 such that the gear 44 passes downwardly between the end play bearing structures 40 and 42 of the concave bearing portions 36 and 38 of the concave bearing 34.

A ramp 43 adjacent the end play bearing 42 tends to provide an inclined or downwardly declining surface to guide the gear 44 downwardly between the end play bearings 38 and 40 and into meshed relation with the gear 50 as shown best in FIG. 6 of the drawings. Thus, accurate meshed relationship of the gear 44 with the gear 50 is obtained and the gear 44 is prevented from moving axially along the axis 48 to a position out of mesh with the gear 50 when the gear 50 is driving the gear 44. Thus, the spit 20 is efficiently driven and the load thereon tends to impose vertical force and tends to insure proper meshed driving relationship of the gear 50 with the gear 44.

When the spit 70 is placed over the barbecue pit area as hereinbefore described and moved vertically downwardly, the facility of doing this requires no precise placement of the outboard end of the spit into a driving bearing and therefore, the use of a person's hands over the hot pit area is not required.

When the spit 20 is placed over the barbecue pit area in the bearings 16 and 34 and when the gear 44 is meshed with the gear 50, the cover 64 is closed causing closing of the switch 66 and thereby permitting energization of the motor 54 when the switch 70 is closed. Thus, the gear 44 cannot rotate until after the cover 64 is closed and thus, the hazard to a person's fingers being caught in the gear 44 is avoided. It will be seen from FIGS. 2 and 3 of the drawings, that when the cover is closed, the switch 68 as hereinbefore described is closed, allowing operation of the motor 54 and when the cover 64 is in open position as shown in FIG. 2 of the drawings, the switch 66 is opened, de-energizing the motor 54 and allowing the spit 20 to be handled without danger of a person's fingers being caught by the gear 44.

In the modification of the invention as shown in FIGS. 4 and 5 of the drawings, the cradle hook 78, in connection with the cover 72, mechanically raises the teeth of the gear 44 out of mesh with complemental teeth on the gear 50 and thus, automatically stops rotation of the spit 20 and gear 44 when the cover 22 is moved to open position. Conversely, when the cover is moved to closed position as indicated by broken lines in FIG. 5 of the drawings, the cradle hook 78 lowers the spit 20 and gear 44 to such a position that the peripheral teeth 80 fully engage with complimental teeth on the gear 50 and allow operation and rotary movement of the gear 44 and spit 20 when the switch 70 is closed.

It will be appreciated that the drive gear 44 adjacent the handle 24 and its removeably meshable relationship with the gear 50 provides a positive drive means in combination with the upwardly open concave bearings 16 and 34 so as to permit simple vertical loading of the spit over the hot barbecue area by means of a person's single hand holding the handle 24 and supporting the spit 20 in cantilever relation therewith.

It will be obvious to those skilled in he art that the handle 24 may be of any length desired as, for example, it may be sufficiently long for both hands of the operator to grasp it and to handle a heavy cantilevered load such as a turkey or the like.

It will be obvious to those skilled in the art that the handling of heavy loads on the spit 20 may be accomplished by a relative length of the handle 24 and in this manner the spit 20 may be efficiently handled entirely by the handle 24 even though heavily loaded so that the hands of the operator need not be disposed over the barbecue pit or hearth area during the placement of the spit 88 in the bearings adjacent thereto and into driving relationship with the driving mechanism 28.

In operation of the modification of the invention as shown in FIG. 7, it will be seen that hamburgers may be grilled on the grill 92 while food may be rotatably barbecued on the modified spit 88 operable in a manner similar to that described in connection with the drive mechanism 28 hereinbefore described in connection with FIGS. 2, 3, 4, 5 and 6 of the drawings.

Various changes in the device herein chosen for purposes of illustration in the drawings will readily occur to those skilled in the art. An obvious change would be the elimination of the teeth from both the motor driven gear and the rotary gear fixed to the spit and thereby reducing said gears to rotors having the simpliest form of engaging means therebetween. Utilizing the weight of the loaded spit to maintain contact, the engaging means therefore may be accomplished by friction. Obviously the friction may be increased in numerous conventional manners, such as providing each rotor with a serrated or roughened periphery, or similarly, providing the driven gear with a peripheral V-shaped indentation and the rotary gear with a suitable mating contour.

Having fully described and disclosed the invention and the preferred embodiment thereof in such clear and concise terms as to enable those skilled in the art to understand and practice same.

I claim:

1. In a barbecue spit and drive mechanism, the combination of: a barbecue fire pit structure; a motorized spit drive mechanism disposed in stationary relation to said pit structure; said drive mechanism having a motor driven rotatable gear operable on a generally horizontal rotary axis; a spit bearing having a generally horizontal axis and disposed in spaced relation with said rotary axis of said rotatable gear; said spit bearing having an upwardly directed concave bearing portion adjacent said rotatable gear; said bearing portion being open to permit generally vertical placement or removal of a spit bearing relative to said concave bearing portion; an elongated barbecue spit having a peripheral bearing disposed on said elongated spit; said peripheral bearing adapted to bear in said concave bearing portion; a rotary gear fixed to said spit and disposed and adapted to mesh with said motor driven gear when said peripheral bearing rests in said concave bearing portion on said spit to maintain said rotary gear being engaged with said motor driven gear in driving relation between said gears; a cover for covering the rotary gear on said spit; and safety means operable upon opening of said cover to prevent rotation of said rotary gear when said cover is open.

2. The invention as defined in claim 1 wherein a motor is disposed to drive said motor driven gear; and a switch is operable by said cover when in closed position over said rotary gear on said spit whereby said motor may be energized through said switch and deenergized when said cover is moved away from said switch to open position above said rotary gear.

* * * * *